United States Patent
Kuo et al.

(10) Patent No.: US 10,152,148 B2
(45) Date of Patent: Dec. 11, 2018

(54) PHASE COMPENSATION METHOD FOR MULTI-SCAN IN TOUCH SENSING SYSTEM AND PHASE COMPENSATION CIRCUIT THEREOF

(71) Applicant: Novatek Microelectronics Corp., Hsinchu (TW)

(72) Inventors: Hung-Cheng Kuo, Hsinchu (TW); Tsen-Wei Chang, Taichung (TW); Chun-Hung Chen, Taipei (TW)

(73) Assignee: Novatek Microelectronics Corp., Hsinchu (TW)

( * ) Notice: Subject to any disclaimer, the term of this patent is extended or adjusted under 35 U.S.C. 154(b) by 225 days.

(21) Appl. No.: 14/475,582

(22) Filed: Sep. 3, 2014

(65) Prior Publication Data

US 2015/0309603 A1     Oct. 29, 2015

(30) Foreign Application Priority Data

Apr. 23, 2014     (TW) .............................. 103114700 A

(51) Int. Cl.
    *G06F 3/041*          (2006.01)
    *G06K 9/00*           (2006.01)

(52) U.S. Cl.
    CPC ............ *G06F 3/041* (2013.01); *G06F 3/0416* (2013.01); *G06K 9/00503* (2013.01)

(58) Field of Classification Search
    CPC ........ G06F 3/041; G06F 3/044; G06F 3/0416; G06F 2203/04104; G06K 9/00503; G06K 9/0053

See application file for complete search history.

(56) References Cited

U.S. PATENT DOCUMENTS 8,237,667 B2    8/2012   Krah
8,674,950 B2    3/2014   Olson
(Continued)

FOREIGN PATENT DOCUMENTS

CN         1791080       6/2006
CN       101673155      3/2010
(Continued)

OTHER PUBLICATIONS

"Office Action of Taiwan Counterpart Application", dated Apr. 29, 2015, p. 1-p. 11.
"Office Action of China Counterpart Application," dated Oct. 11, 2017, p. 1-p. 7.

*Primary Examiner* — Sardis F Azongha
(74) *Attorney, Agent, or Firm* — JCIPRNET

(57) ABSTRACT

A phase compensation method for multi-scan in touch sensing system is provided. The phase compensation method includes the following steps. A plurality of carrier signals are received, and a demodulating operation is preformed on each of the carrier signals to obtain a first component signal and a second component signal of each of the carrier signals. An inverse matrix operation is respectively preformed on the first component signal and the second component signal both demodulated by the demodulating operation. A signal mixing operation is preformed on the first component signal and the second component signal both processed by the inverse matrix operation to obtain raw data of each of the carrier signals. Furthermore, a phase compensation circuit applying afore-said phase compensation method is also provided.

23 Claims, 9 Drawing Sheets

(56) References Cited

U.S. PATENT DOCUMENTS

| | | | |
|---|---|---|---|
| 8,791,920 B2 | 7/2014 | Krah | |
| 8,890,840 B2 * | 11/2014 | Kuo | G06F 3/044 |
| | | | 345/174 |
| 9,013,429 B1 * | 4/2015 | Krekhovetskyy | G06F 3/03545 |
| | | | 345/173 |
| 9,086,750 B2 | 7/2015 | Krah | |
| 9,310,943 B1 * | 4/2016 | Omelchuk | G06F 3/044 |
| 2009/0066669 A1 | 3/2009 | Olson | |
| 2010/0060593 A1 | 3/2010 | Krah | |
| 2012/0299880 A1 | 11/2012 | Krah | |
| 2013/0021291 A1 * | 1/2013 | Kremin | G06F 3/0416 |
| | | | 345/174 |
| 2013/0069905 A1 | 3/2013 | Krah et al. | |
| 2013/0207906 A1 * | 8/2013 | Yousefpor | G06F 3/0418 |
| | | | 345/173 |
| 2013/0330017 A1 * | 12/2013 | Elias | G06F 3/0418 |
| | | | 382/254 |
| 2014/0306913 A1 | 10/2014 | Krah | |
| 2015/0035797 A1 * | 2/2015 | Shahparnia | G06F 3/041 |
| | | | 345/174 |
| 2015/0130731 A1 * | 5/2015 | Chang | G06F 3/0416 |
| | | | 345/173 |

FOREIGN PATENT DOCUMENTS

| | | |
|---|---|---|
| CN | 102150112 | 8/2011 |
| TW | 200917110 | 4/2009 |

\* cited by examiner

US 10,152,148 B2

PHASE COMPENSATION METHOD FOR MULTI-SCAN IN TOUCH SENSING SYSTEM AND PHASE COMPENSATION CIRCUIT THEREOF

CROSS-REFERENCE TO RELATED APPLICATION

This application claims the priority benefit of Taiwan application serial no. 103114700, filed on Apr. 23, 2014. The entirety of the above-mentioned patent application is hereby incorporated by reference herein and made a part of this specification.

BACKGROUND OF THE DISCLOSURE

Field of the Disclosure

The disclosure relates to a phase compensation method and a phase compensation circuit, and more particularly, relates to a phase compensation method and a phase compensation circuit for multi-scan in touch sensing system.

Description of Related Art

In a multi-scan touch sensing system, when a touch panel is driven, carrier signals provided by a transmitter (TX) of a front-end circuit are received to drive sensing units on the touch panel to perform a touch sensing. The carrier signals are sent to a signal processing circuit served as a receiver (RX) after passing the touch panel, and the signal processing circuit is configured to demodulate the carrier signals to obtain data carried on the carrier signals, e.g. raw data, which includes a signal amplitude and so on.

Generally, for the touch sensing system which adopts a multi-scan technology, there is a phase shift between the carrier signals provided by the transmitter. In order to eliminate the phase shift, the signal processing circuit may perform a phase compensation on the carrier signals during the demodulation to obtain a signal processing result with a more preferable quality. In a conventional method for signal compensation, a hardware architecture with re-designed signal processing circuit may be provided to perform the compensation on the carrier signals one by one. However, said method may increase a hardware cost for circuitry and need more of correction requirements. In another conventional method for signal compensation, a phase spread of the carrier signals cannot be solved, and thus it is prone to induce noises which increase difficulties in processing the signals.

SUMMARY OF THE DISCLOSURE

The disclosure is directed to a phase compensation method capable of automatically performing compensation on carrier signals of a multi-scan touch sensing system.

The disclosure is directed to a phase compensation circuit capable of automatically performing compensation on carrier signals of a multi-scan touch sensing system.

A phase compensation method of the disclosure for multi-scan in touch sensing system is provided. The phase compensation method includes the following steps. A plurality of carrier signals are received, and a demodulating operation is preformed on each of the carrier signals to obtain a first component signal and a second component signal of each of the carrier signals. An inverse matrix operation is respectively preformed on the first component signal and the second component signal both demodulated by the demodulating operation. A signal mixing operation is preformed on the first component signal and the second component signal both processed by the inverse matrix operation to obtain data carried on each of the carrier signals.

In an embodiment of the disclosure, the step of performing the demodulating operation on each of the carrier signals to obtain the first component signal and the second component signal of each of the carrier signals includes the following steps. A first demodulating signal and a second demodulating signal are respectively received, and each of the carrier signals is mixed with the first demodulating signal and the second demodulating signal respectively. A filtering operation is performed on each of the carrier signals including the first demodulating signal and on each of the carrier signals including the second demodulating signal to obtain the first component signal and the second component signal of each of the carrier signals.

In an embodiment of the disclosure, the step of respectively performing the inverse matrix operation on the first component signals and the second component signals both demodulated by the demodulating operation includes the following steps. Via a signal processing channel, the inverse matrix operation is performed on the first component signals demodulated by a first demodulating operation and the second component signals demodulated by a second demodulating operation.

In an embodiment of the disclosure, the step of respectively performing the inverse matrix operation on the first component signals and the second component signals both demodulated by the demodulating operation includes the following steps. Via a first signal processing channel, the inverse matrix operation is performed on the first component signals demodulated by a first demodulating operation. Via a second signal processing channel, the inverse matrix operation is performed on the second component signals demodulated by a second demodulating operation.

In an embodiment of the disclosure, the first component signals are one of an in-phase signal and a quadrature signal in a quadrature amplitude modulation mode. The second component signals are another one of the in-phase signal and the quadrature signal in the quadrature amplitude modulation mode.

In an embodiment of the disclosure, the first demodulating operation is one selected from an in-phase demodulating operation and a quadrature demodulating operation in correspondence to the first component signals. The second demodulating operation is another one selected from the in-phase demodulating operation and the quadrature demodulating operation in correspondence to the second component signals.

In an embodiment of the disclosure, the received carrier signals are already processed by a matrix operation before being received. The inverse matrix operation processes the first component signals and the second component signals both demodulated by the demodulating operation in correspondence to the matrix operation.

In an embodiment of the disclosure, the step of performing the signal mixing operation on the first component signals and the second component signals both processed by the inverse matrix operation includes the following steps. A power operation is performed on the first component signals and the second component signals both processed by the inverse matrix operation. A summation operation is performed on the first component signals and the second component signals both processed by the power operation.

In an embodiment of the disclosure, the step of performing the signal mixing operation on the first component signals and the second component signals both processed by the inverse matrix operation further includes the following steps. A radical operation is performed on the first component signals and the second component signals both processed by the power operation.

In an embodiment of the disclosure, the step of respectively performing the inverse matrix operation on the first component signals and the second component signals both demodulated by the demodulating operation is performed before the step of performing the signal mixing operation on the first component signals and the second component signals both processed by the inverse matrix operation to obtain the data carried on each of the carrier signals.

A phase compensation circuit for multi-scan in touch sensing system of the disclosure includes a plurality of signal demodulating channels, a signal processing unit and a signal compensation unit. The signal demodulating channels receive a plurality of carrier signals, and perform a demodulating operation on each of the carrier signals to obtain a first component signal and a second component signal of each of the carrier signals. The signal processing unit respectively performs an inverse matrix operation on the first component signals and the second component signals both demodulated by the demodulating operation. The signal compensation unit performs a signal mixing operation on the first component signal and the second component signal both processed by the inverse matrix operation to obtain data carried on each of the carrier signals.

In an embodiment of the disclosure, each of the signal demodulating channels includes a first demodulating channel and a second demodulating channel. The first demodulating channel is configured to mix a corresponding one of the carrier signals with a first demodulating signal, and perform a filtering operation on the corresponding one of the carrier signals mixed with and including the first demodulating signal to obtain the first component signal of the corresponding one of the carrier signals. The second demodulating channel is configured to mix the corresponding one of the carrier signals with a second demodulating signal, and perform the filtering operation on the corresponding one of the carrier signals mixed with and including the second demodulating signal to obtain the second component signal of the corresponding one of the carrier signals.

In an embodiment of the disclosure, each of the signal demodulating channels further includes a signal receiving and amplifying unit. The signal receiving and amplifying unit is configured to receive and amplify a corresponding one of the carrier signals to transfer the corresponding one of the carrier signals to the first demodulating channel and the second demodulating channel In an embodiment of the disclosure, the phase compensating circuit further includes a signal generating unit. The signal generating unit is configured to generate the first demodulating signal and the second demodulating signal.

In an embodiment of the disclosure, the signal processing unit includes a signal processing channel. The signal processing channel includes a matrix operation unit configured to perform the inverse matrix operation on the first component signals and the second component signals.

In an embodiment of the disclosure, the signal processing unit includes a first signal processing channel and a second signal processing channel. The first signal processing channel includes a first matrix operation unit configured to perform the inverse matrix operation on the first component signals. The second signal processing channel includes a second matrix operation unit configured to perform the inverse matrix operation on the second component signals.

In an embodiment of the disclosure, the first component signals are one of an in-phase signal and a quadrature signal in a quadrature amplitude modulation mode. The second component signals are another one of the in-phase signal and the quadrature signal in the quadrature amplitude modulation mode.

In an embodiment of the disclosure, the first signal processing unit is one selected from an in-phase demodulating channel and a quadrature demodulating channel in correspondence to the first component signals, and configured to perform the demodulating operation on the first component signal. The second signal processing unit is another one selected from the in-phase demodulating channel and the quadrature demodulating channel in correspondence to the second component signals, and configured to perform the demodulating operation on the second component signal.

In an embodiment of the disclosure, the received carrier signals are already processed by a matrix operation before being received. The inverse matrix operation processes the first component signals and the second component signals both demodulated by the demodulating operation in correspondence to the matrix operation.

In an embodiment of the disclosure, the signal compensation unit includes a power operation unit and a summation operation unit. The power operation unit performs a power operation on the first component signals and the second component signals both processed by the inverse matrix operation. The summation operation unit performs a summation operation on the first component signals and the second component signals both processed by the power operation.

In an embodiment of the disclosure, the signal compensation unit further includes a radical operation unit. The radical operation unit performs a radical operation on the first component signals and the second component signals both processed by the power operation.

Based on above, according to the exemplary embodiments of the disclosure, the phase compensation method and the phase compensation for multi-scan in touch sensing system first perform the demodulating operation on the different component signals via the signal processing channels before performing the inverse matrix operation on the component signals demodulated by the demodulating operation. The method is capable of automatically performing compensation on carrier signals of the multi-scan touch sensing system.

To make the above features and advantages of the disclosure more comprehensible, several embodiments accompanied with drawings are described in detail as follows.

DESCRIPTION OF THE EMBODIMENTS

Generally speaking, touch sensing systems may be classified into a single-scan touch sensing system and a multi-scan touch sensing system according to amount of scan signals provided by a transmitter of a front-end circuit to a touch panel in the same time sequence. In the single-scan touch sensing system, the transmitter of the front-end circuit only provides one scan signal to the touch panel in the same time sequence. In contrast, in the multi-scan touch sensing system, the transmitter of the front-end circuit simultaneously provides multiple scan signals to the touch panel in the same time sequence. For the touch sensing systems of two scan-types, a linear model may usually be used to comprehend the systems, and an expression of the linear model includes a signal amplitude and a signal phase.

Figure 1:
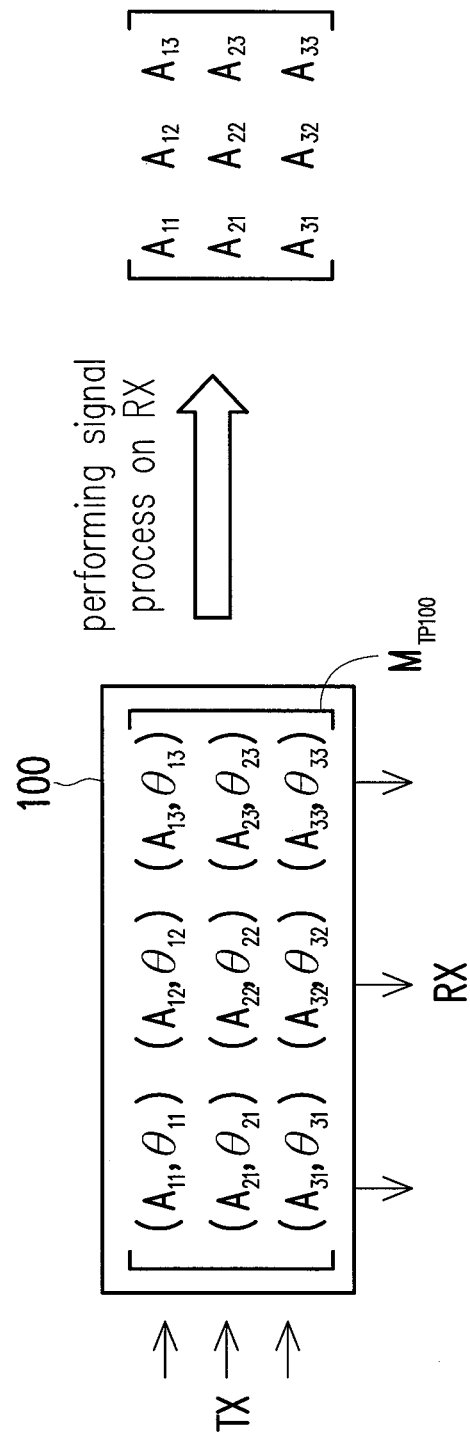
FIG. 1 illustrates a 3×3 matrix for representing a linear model of a touch panel in a touching sensing system.

For instance, FIG. 1 illustrates a 3×3 matrix for representing a linear model of a touch panel in a touching sensing system. Referring to FIG. 1, in this example, a transmitter (not illustrated) of a front-end circuits of a touch panel 100 provides a plurality of signals TX to the touch panel 100, and the signals TX are sent to a signal processing circuit (not illustrated) served as a receiver after passing the touch panel 100, wherein the signals sent to the receiver are represented by RX. In the touch panel 100 represented by the linear model, each matrix element has a corresponding signal amplitude and a corresponding signal phase. For example, as shown in FIG. 1, in a touch panel matrix $M_{TP100}$, the element at a first column and a first line has the signal amplitude being $A_{11}$ and the signal phase being $\theta 11$, which are marked as ($A_{11}$, $\theta_{11}$). The signal amplitudes and the signal phases of the rest of the matrix elements have been directly marked in FIG. 1. Generally speaking, the signal processing circuit at back-end of the touch panel 100 may process the signals RX to obtain the signal amplitudes $A_{11}$ to $A_{33}$ and so on (which are also known as raw data).

Figure 2:
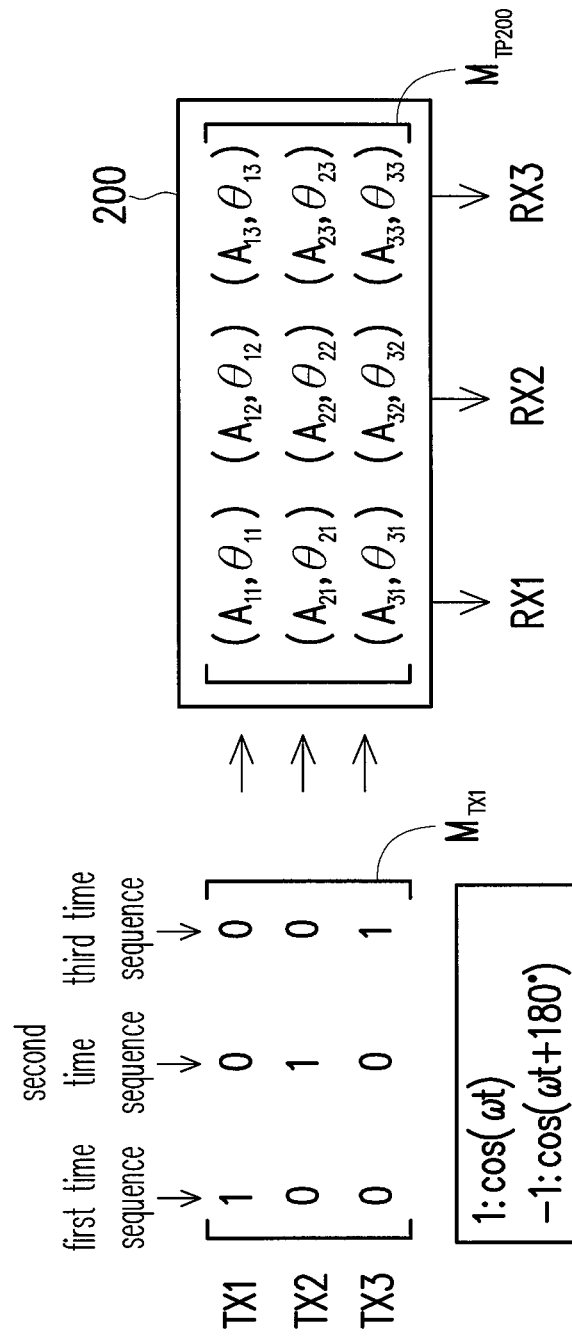
FIG. 2 illustrates a schematic diagram of a single-scan touch sensing system.

In correspondence to the linear model of the touch sensing system, a type of the signals TX may be in form of a carrier signal. FIG. 2 illustrates a schematic diagram of a single-scan touch sensing system, in which carrier signals transferred to a touch panel 200 are represented by TX1 to TX3. Referring to FIG. 2, the transmitter of the single-scan touch sensing system only provides one scan signal to the touch panel 200 in the same time sequence. Accordingly, in a carrier signal matrix $M_{TX1}$, only the element at the first line and the first column is represented as "1" (i.e., the carrier signal TX1 includes a signal component being cos(ωt) at the time) corresponding to a first time sequence, whereas the rest of elements on the first column are "0". Similarly, in a second time sequence, the element at the second column and the second line is "1" whereas the rest of the elements are "0". When a dimension of the carrier signal matrix in the signal-scan touch sensing system expands, the elements in each column may be deduced by analogy.

Figure 3:
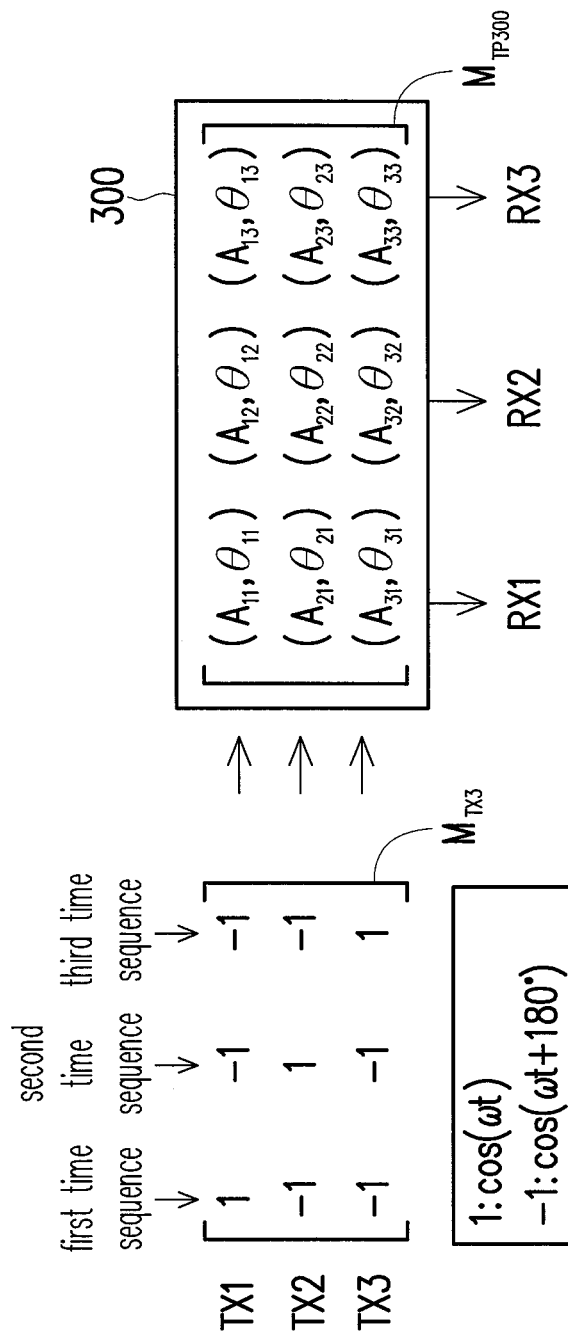
FIG. 3 illustrates a schematic diagram of a multi-scan touch sensing system.

FIG. 3 illustrates a schematic diagram of a multi-scan touch sensing system, in which carrier signals transferred to a touch panel 300 are represented by TX1 to TX3. Referring to FIG. 3, the transmitter of the multi-scan touch sensing system simultaneously provides multiple scan signals to the touch panel 300 in the same time sequence. Accordingly, in a carrier signal matrix $M_{TX3}$, the elements in the first column corresponding to a first time sequence are, for example, $[1\ -1\ -1]^T$; the elements in the second column corresponding to a second time sequence are, for example, $[-1\ 1\ -1]^T$; and the elements in the third column corresponding to a third time sequence are, for example, $[-1\ -1\ 1]^T$. Therein, the element expressed by "1" represents that the corresponding carrier signal includes a signal component being cos(ωt), and the element expressed by "−1" represents that the corresponding carrier signal includes a signal component being cos(ωt+180°).

It should be noted that, the three carrier signals TX1 to TX3 are used as an example in related examples of FIG. 1 to FIG. 3. Generally speaking, in practical applications, the amount of the carrier signals transferred to the touch panel may at least include 8 to 10 carrier signals. In this case, the dimension of the matrix of the touch panel may be adjusted accordingly, and the application scope of the phase compensation method and the phase compensation circuit for the touch sensing system of the disclosure is not limited by the amount of the carrier signals transferred to the touch panel.

Figure 4:
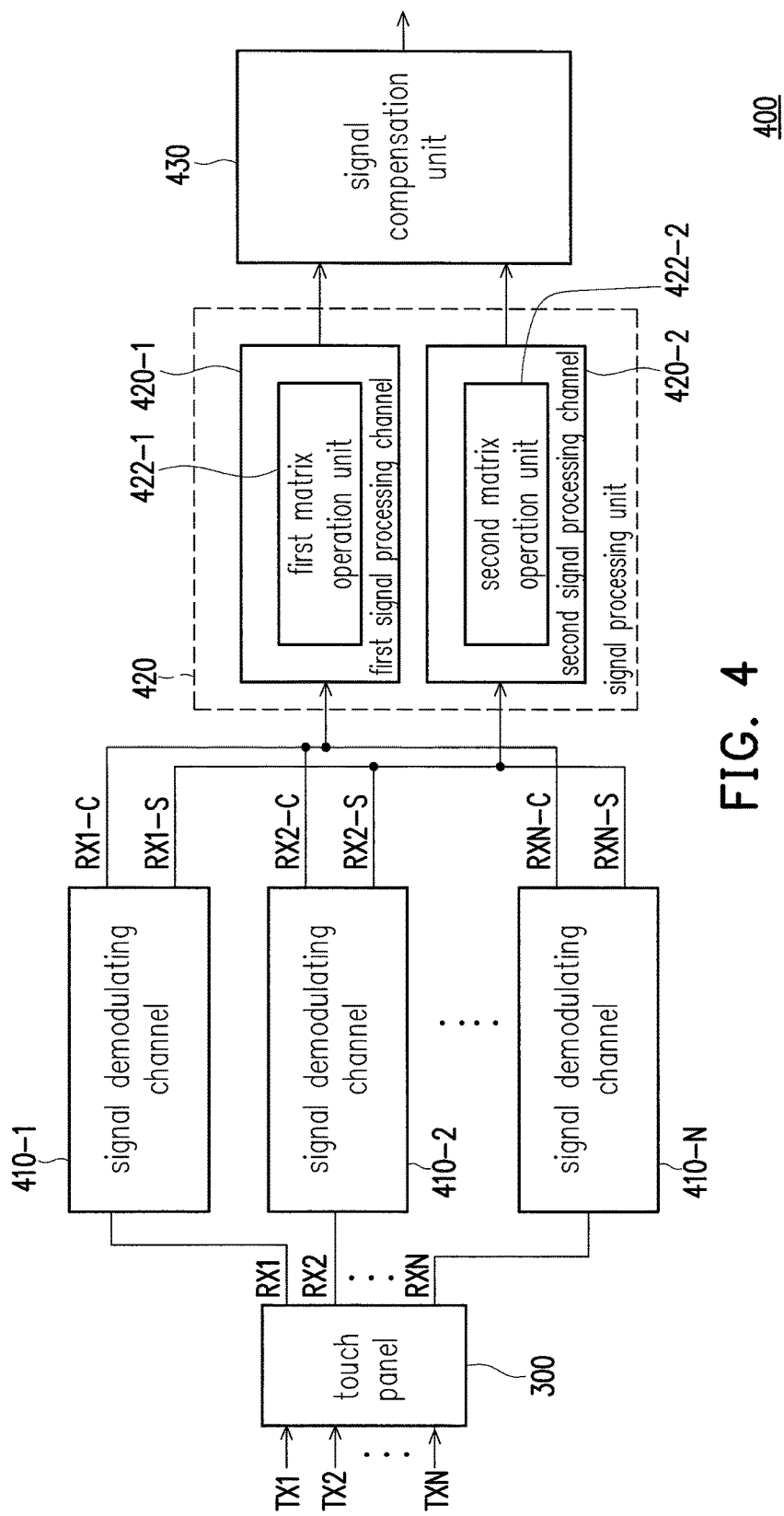
FIG. 4 illustrates a multi-scan touch sensing system and a phase compensation circuit thereof according to an embodiment of the disclosure.

FIG. 4 illustrates a multi-scan touch sensing system and a phase compensation circuit thereof according to an embodiment of the disclosure. Referring to FIG. 4, a phase compensation circuit 400 of the present embodiment includes a plurality of signal demodulating channels 410-1 to 410-N, a signal processing unit 420 and a signal compensation unit 430. The signal demodulating channels 410-1 to 410-N are respectively configured to receive a plurality of carrier signals RX1 to RXN, and perform a demodulating operation on each of the carrier signals RX1 to RXN to obtain first component signals RX1-C to RXN-C and second component signal RX1-S to RXN-S of each of the carrier signals RX1 to RXN. In the present embodiment, the demodulating operation may include, for example, an in-phase demodulating operation and a quadrature demodulating operation in a quadrature amplitude modulation. However, the disclosure is not limited thereto. A method for the demodulating operation and steps thereof may be adjusted according to different modulation schemes of the transmitter. In the present embodiment, the carrier signals RX1 to RXN include, for example, a signal component in form of a sinusoidal signal. Accordingly, after each of the carrier signals RX1 to RXN is demodulated, the obtained first component signals RX1-C to RXN-C are the signal components in form of a cosine wave for example, and the obtained second component signals RX1-S to RXN-S are the signal components in form of a sine wave for example.

It should be noted that, in the present embodiment, the signals RX1 to RXN received by the phase compensation circuit 400 are the carrier signals for example, in which a carrier wave generally refers to a wave form being modulated for transmitting signal. However, the application scope for the phase compensation method and the phase compensation circuit for the touch sensing system of the disclosure is not limited by the signals for processing the forms of the carrier wave. For instance, in case the signals RX1 to RXN received by the phase compensation circuit 400 are square signals, the phase compensation circuit 400 may first adjust the square signal into the sinusoidal signal and then perform a phase compensation on the sinusoidal signal, so as to obtain the data carried on the carrier signals, e.g. raw data.

Subsequently, the signal processing unit 420 of the present embodiment includes at least two signal processing channels 420-1 and 420-2. A first signal processing channel 420-1 and a second signal processing channel 420-2 perform an inverse matrix operation on the first component signals RX1-C to RXN-C and the second component signals RX1-S and RXN-S respectively. In the present embodiment, the first signal processing channel 420-1 includes a first matrix operation unit 422-1. The first matrix operation unit 422-1 is configured to perform the inverse matrix operation on the first component signals RX1-C to RXN-C demodulated by the demodulating operation. The second signal processing channel 420-2 includes a second matrix operation unit 422-2. The second matrix operation unit 422-2 is configured to perform the inverse matrix operation on the second component signals RX1-S to RXN-S.

In the present embodiment, the carrier signals TX1 to TXN transferred to a touch panel 300 are first processed by a matrix operation such as calculating a product of the carrier signal matrix and a touch panel matrix (i.e., $M_{TX3} \cdot M_{TP100}$ in case of FIG. 3), so as to generate the carrier signals RX1 to RXN. In other words, the carrier signals RX1 to RXN received by the phase compensating circuit 400 has been processed by said matrix operation before being received. Therefore, in the present embodiment, the signal processing unit 420 is divided into two signal processing channels having one that performs the inverse matrix operation on the first component signal of the carrier signal and another one that performs the inverse matrix operation on the second component signal of the carrier signal, separately. This inverse matrix operation processes the first component signal and the second component signal both demodulated by the demodulating operation in correspondence to the matrix operation of the touch panel 300 (i.e., $M_{TX3} \cdot M_{TP100} \cdot M_{TP100}^{-1}$ in case of FIG. 3, wherein $M_{TP100}^{-1}$ is an operation matrix utilized by the signal processing unit 420 to perform the inverse matrix operation on the carrier signal, $M_{TP100} \cdot M_{TP100}^{-1} = I$, and I is an identity matrix). It should be noted that, the application scope of the phase compensation method and the phase compensation circuit for the touch sensing system of the disclosure is not limited by the amount of the carrier signals transferred to the touch panel.

Subsequently, the signal compensation unit 430 of the present embodiment performs a signal mixing operation on the first component signals RX1-C to RXN and the second component signals RX1-S to RXN-S both demodulated by the demodulating operation and processed by the inverse matrix operation, so as to obtain the data (which includes an amplitude of each of the carrier signals) carried on each of the carrier signals, e.g. raw data. In the present embodiment, the signal mixing operation includes: performing at least one of a power operation (e.g. a square operation), a summation operation and a radical operation on the first component signals RX1-C to RXN and the second component signals RX1-S to RXN-S, so as to perform the phase component on each of the carrier signals.

In the present embodiment, the step of performing the phase component on each of the carrier signals RX1 to RXN by the phase compensating circuit 400 includes: first, performing the corresponding demodulating operation on each of the carrier signals RX1 to RXN by utilizing the signal demodulating channels 410-1 to 410-N. Subsequently, the phase compensating circuit 400 then utilizes the signal processing unit 420 to respectively perform the inverse matrix operation on the first component signals RX1-C to RXN-C and the second component signals RX1-S to RXN-S both demodulated by the demodulating operation. Thereafter, the signal compensation unit 400 then utilizes the signal compensation unit 430 to perform the signal mixing operation on the first component signals RX1-C to RXN-C and the second component signals RX1-S to RXN-S both demodulated by the demodulating operation and processed by the inverse matrix operation, so as to perform the phase compensation on each of the component signals. This phase compensation method is capable of reducing hardware cost of the circuitry while effectively solving the phase spread of the carrier signals.

Figure 5:
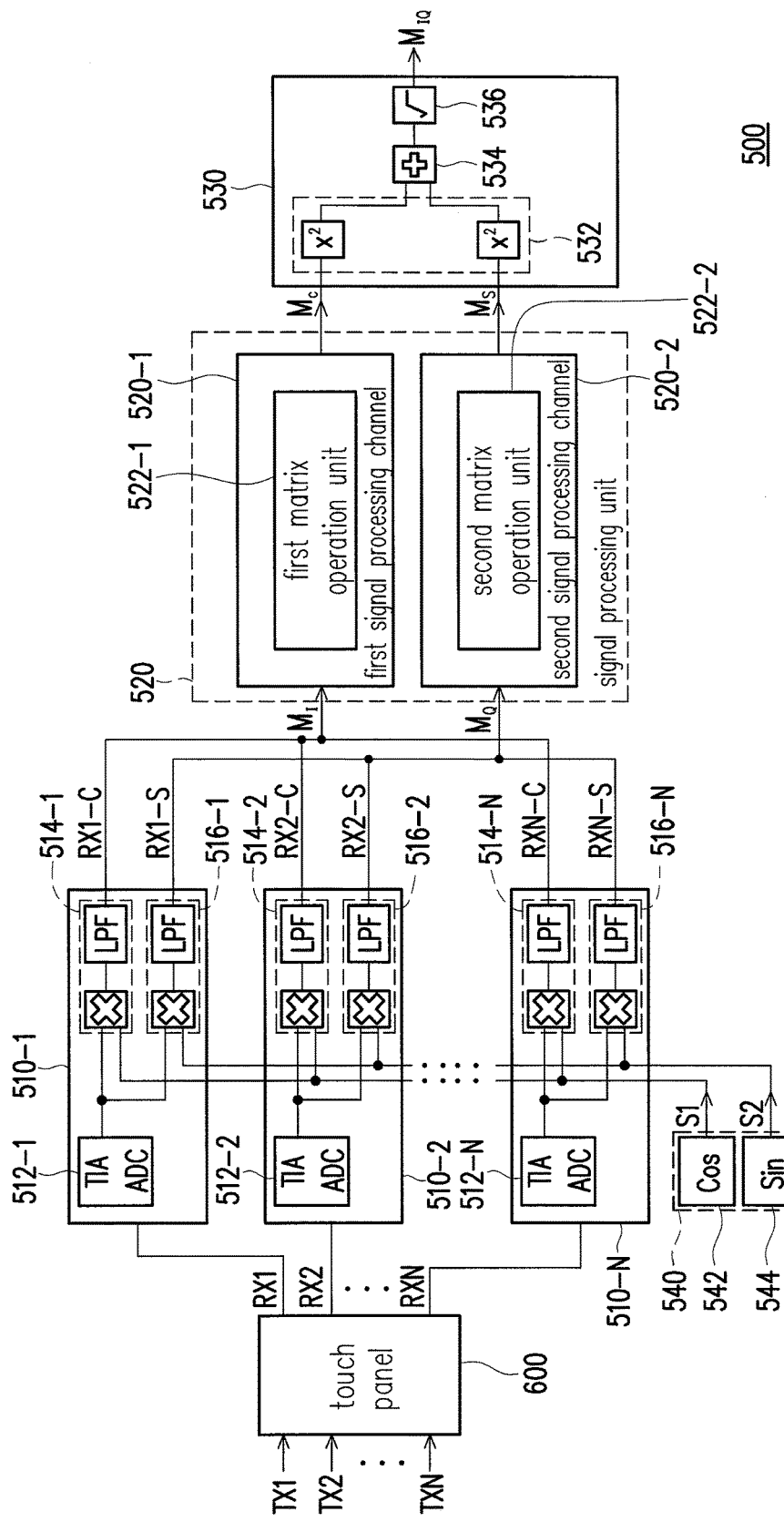
FIG. 5 illustrates a multi-scan touch sensing system and a phase compensation circuit thereof according to another embodiment of the disclosure.
Figure 6:
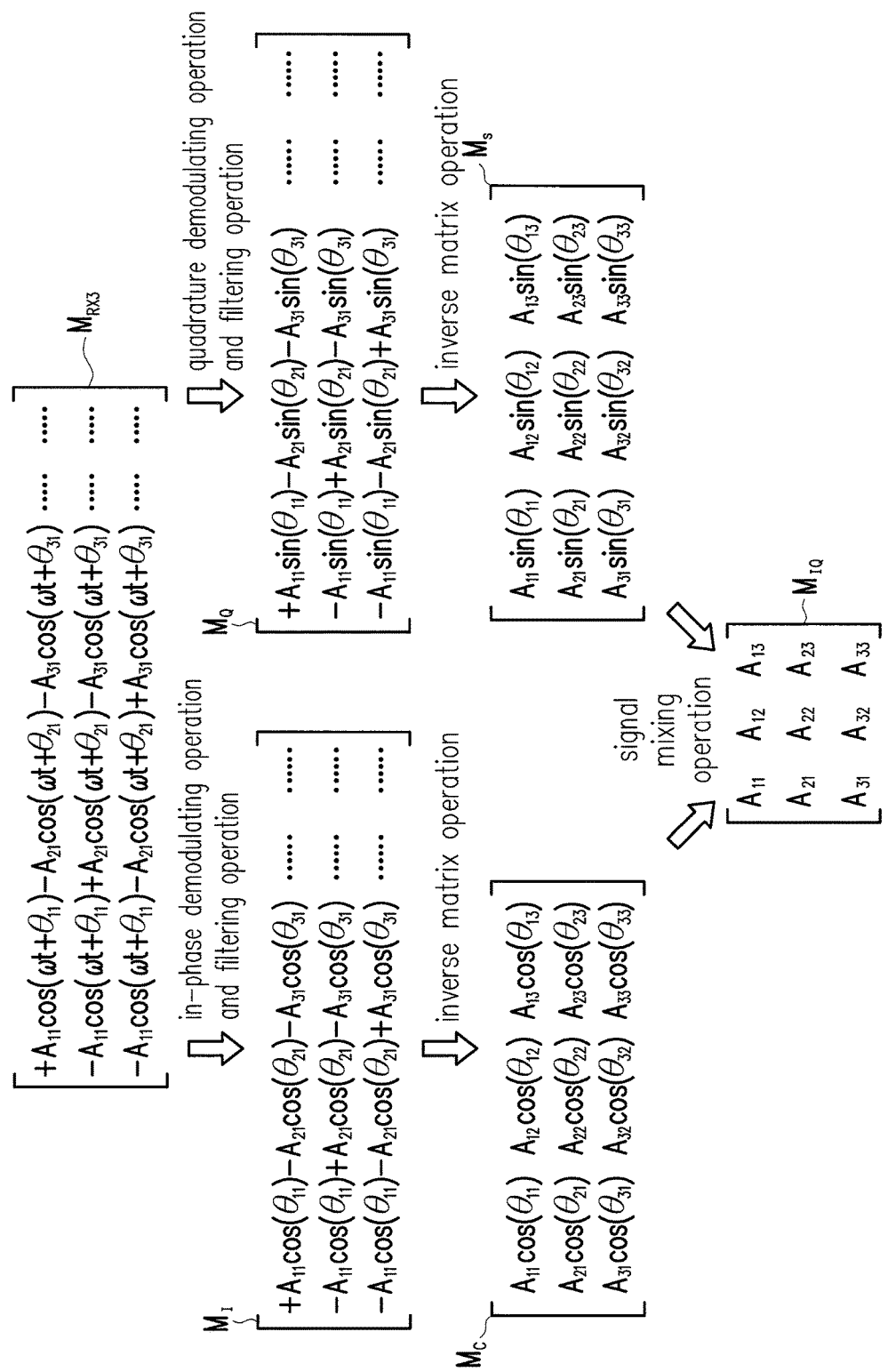
FIG. 6 illustrates a phase compensation method for multi-scan in touch sensing system according to an embodiment of the disclosure.

FIG. 5 illustrates a multi-scan touch sensing system and a phase compensation circuit thereof according to another embodiment of the disclosure. FIG. 6 illustrates a phase compensation method for multi-scan in touch sensing system according to an embodiment of the disclosure. Referring to FIG. 5 and FIG. 6, for the convenience of the description, amount of the carrier signals transferred to the phase compensation circuit is illustrated with three signals in the embodiment of FIG. 6 for example, but the application scope of the phase compensation method and the phase compensation circuit for the touch sensing system of the disclosure are not limited by the amount of the compensating circuits (i.e., not limited by a dimension of a matrix depicted in FIG. 6). Moreover, although the demodulating operation is illustrated with the in-phase demodulating operation and the quadrature demodulating operation in the quadrature amplitude modulation as an example in the present embodiment, the disclosure is not limited thereto.

In the present embodiment, each of signal demodulating channels 510-1 to 510-N includes signal receiving and amplifying units 512-1 to 512-N, first demodulating channels 514-1 to 514-N and second demodulating channels 516-1 to 516-N. The signal receiving and amplifying units 512-1 to 512-N are configured to receive and amplify a corresponding one of the carrier signals, so as to transfer the corresponding one of the carrier signals being received and amplified to the corresponding first demodulating channel and the corresponding second demodulating channel. For instance, the signal receiving and amplifying unit 512-1 receives and amplifies the carrier signal RX1, and then transfers the carrier signal RX1 being received and amplified to the first demodulating channel 514-1 and the second demodulating channel 516-1. In this example, the signal receiving and amplifying unit 512-1 includes, for example, a transimpedance amplifier (TIA) and an analog-to-digital converter (ADC). The transimpedance amplifier is configured to amplify the carrier signal RX1 to fall within an input range required by the analog-to-digital converter.

Next, the first demodulating channels 514-1 to 514-N are, for example, in-phase demodulating channels. The in-phase demodulating channels 514-1 to 514-N are configured to mix a corresponding one of the carrier signals RX1 to RXN with a first demodulating signal S1, and perform a filtering operation on the corresponding one of the carrier signals mixed with and including the first demodulating signal S1 to obtain the first component signal of the corresponding one of the carrier signals. For instance, the in-phase demodulating channel 514-1 mixes the carrier signal RX1 with the first demodulating signal S1, and performs the filtering operation on the carrier signal RX1 mixed with and including the first demodulating signal Si to obtain the first component signal RX1-C of the carrier signal RX1. In the exemplary embodiment of the in-phase demodulating channels, the first demodulating signal S1 is, for example, the demodulating signal in form of the cosine wave. Accordingly, the signal components in form of the cosine wave (i.e., the first component signals RX1-C to RXN-C) may be analyzed from the carrier signals RX1 to RXN processed by the filtering operation.

Similarly, the second demodulating channels 516-1 to 516-N are, for example, quadrature demodulating channels. The quadrature demodulating channels 516-1 to 516-N are configured to mix a corresponding one of the carrier signals RX1 to RXN with a second demodulating signal S2, and perform the filtering operation on the corresponding one of the carrier signals mixed with and including the second demodulating signal S2 to obtain the second component signal of the corresponding one of the carrier signals. For instance, the quadrature demodulating channel 516-1 mixes the carrier signal RX1 with the second demodulating signal S2, and performs the filtering operation on the carrier signal RX1 mixed with and including the second demodulating signal S2 to obtain the second component signal RX1-S of the carrier signal RX1. In the exemplary embodiment of the quadrature demodulating channels, the second demodulating signal S2 is, for example, the demodulating signal in form of the sine wave. Accordingly, the signal components in form of the sine wave (i.e., the second component signals RX1-S to RXN-S) may be analyzed from the carrier signals RX1 to RXN processed by the filtering operation.

In the present embodiment, the phase compensating circuit 500 further includes a signal generating unit 540 having a first signal generating circuit 542 configured to generate the first demodulating signal Si for example. In the exemplary embodiment of the in-phase demodulating operation, the first demodulating signal S1 is, for example, a signal in form of cos(ωt), wherein ω is a demodulating baseband. On the other hand, a second signal generating circuit 544 of the signal generating unit 540 is configured to generate the second demodulating signal S2 for example. In the exemplary embodiment of the quadrature demodulating operation, the second demodulating signal S2 is, for example, a signal in form of sin(cot).

In the present embodiment, the first component signal is the in-phase signal in the quadrature amplitude modulation mode, and the second component signal is the quadrature signal in the quadrature amplitude modulation mode. Accordingly, in correspondence to the first component signal, the first signal processing channel is identical to the in-phase demodulating channel configured to perform the in-phase demodulating operation on the first component signal. In correspondence to the second component signal, the second signal processing channel is identical to the quadrature demodulating channel configured to perform the quadrature demodulating operation on the second component signal. In another embodiment, in correspondence to change of the first component signal (e.g., the first component signal is the quadrature signal,) design of the first signal processing channel may be correspondingly adjusted for the quadrature demodulating channel. In correspondence of the second component signal (e.g., the second component signal is the in-phase signal), design of the second signal processing channel may be correspondingly adjusted for the in-phase demodulating channel.

On the other hand, further understanding of operations of the first demodulating channels 514-1 to 514-N and the second demodulating channels 516-1 to 516-N of the present embodiment may be obtained from the schematic diagram of FIG. 6. Referring to FIG. 6, take the amount of the carrier signals as three for example, $M_{RX3}$ is transferred to the carrier signal matrix of the first demodulating channel and the second demodulating channel in which the elements of the first column are as shown by the carrier signal matrix $M_{RX3}$ of FIG. 6, and the elements of the first column are corresponding to the signals RX1 to RX3 received by the phase compensating circuit in the first time sequence. The first demodulating channel and the second demodulating channel respectively perform the in-phase demodulating operation, the quadrature demodulating operation and the filtering operation on the elements on the first column of the carrier signal matrix $M_{RX3}$ in the first time sequence, so as to obtain the first component signals RX1-C to RX3-C and the second component signals RX1-S to RX3-S of the carrier signals RX1 to RX3 in the first time sequence, in which demodulating and filtering results are respectively shown by the elements on the first columns of matrices $M_I$ and $M_Q$. Principles and results for the first demodulating channel and the second demodulating channel that respectively perform the in-phase demodulating operation, the quadrature demodulating operation and the filtering operation on the elements on the second column and the elements on the third column of the carrier signal matrix $M_{RX3}$ in the second time sequence and the third time sequence may be inferred by reference with the above exemplary demodulating operation and filtering operation for the first time sequence. In view of FIG. 6, it can be known that in the matrices $M_I$ and $M_Q$, each of the elements is no longer including a frequency factor ω, and accordingly, the steps of the demodulation operation and the filtering operation are capable of eliminating influences of the frequency to the raw data.

Subsequently, referring to FIG. 5, in which the first component signals RX1-C to RXN-C and the second component signals RX1-S to RXN-S of the carrier signals RX1 to RXN have been obtained. The signal processing unit 520 of the present embodiment is divided into two signal processing channels 520-1 and 520-2 respectively including a first matrix operation unit 522-1 and a second matrix operation unit 522-2. The first matrix operation unit 522-1 performs the inverse matrix operation on the first component signals RX1-C to RXN-C, and the second matrix operation unit 522-2 performs the inverse matrix operation on the second component signals RX1-S to RXN-S, separately. The inverse matrix operation processes the first component signals RX1-C to RXN-C and the second component signals RX1-S to RXN-S both modulated by the demodulating operation in correspondence to the carrier signals TX1 to TXN processed by the matrix operation of the touch panel 600.

Accordingly, in FIG. 6, the matrices $M_I$ and $M_Q$ both demodulated by the demodulating operation and processed by the filtering operation are then processed by the inverse matrix operation respectively performed by the matrix operation units of different channels, and results thereof are as shown by matrices $M_C$ and $M_S$. In view of a processed result of each of the elements in the matrices $M_C$ and $M_S$, as compared to the matrices $M_I$ and $M_Q$, each matrix element corresponding to each of the carrier signals in the matrices $M_C$ and $M_S$ has been further simplified, and thus interference between each of the carrier signals are effectively reduced.

Subsequently, referring to FIG. 5, the signal compensation unit 530 of the present embodiments includes a power operation unit 532 a summation operation 534 unit and a radical operation unit 536. The power operation unit 532 performs a power operation on the first component signals RX1-C and RXN-C and the second component signals RX1-S to RXN-S both processed by the inverse matrix operation. In this example, the power operation is illustrated by using a square operation for example. Subsequently, the summation operation unit 534 performs a summation operation on the first component signals RX1-C and RXN-C and the second component signals RX1-S to RXN-S both processed by the power operation. Thereafter, the radical operation unit 536 performs a radical operation on the first component signals RX1-C and RXN-C and the second component signals RX1-S to RXN-S both processed by the power operation, so as to obtain the data carried on each of the carrier signals, e.g. raw data. As in correspondence to said square operation, the radical operation herein is a square root operation for example. In the present embodiment, the first component signals RX1-C and RXN-C and the second component signals RX1-S to RXN-S of each of the carrier signals are the signals in form of the cosine wave and the signals in form of the sine wave respectively, and accordingly, the signal compensation unit 530 is capable of effectively eliminating influences of phase to the raw data of the carrier signals and thereby obtaining a raw data matrix $M_{IQ}$. Therefore, the signal compensation unit 530 is capable of performing the phase compensation on each of the carrier signals to obtain the raw data with the more preferable quality.

In another embodiment of the disclosure, the signal compensation unit 530 is also capable of effectively eliminating influences of phase to the raw data of the carrier signals simply by using the square operation and the summation operation. Accordingly, the step of performing the radical operation may be optionally implemented, and the disclosure is not limited thereto.

Figure 9:
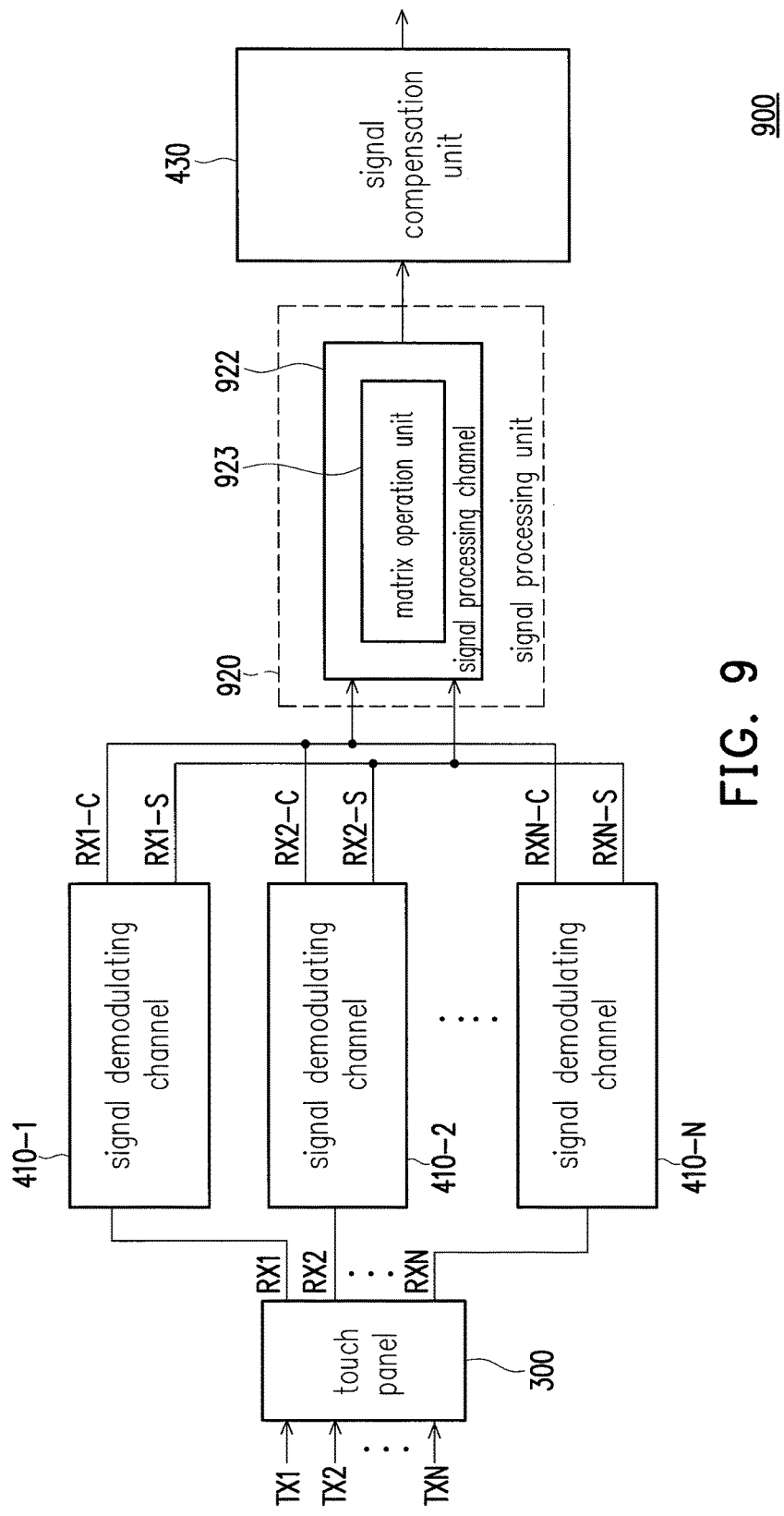
FIG. 9 illustrates a multi-scan touch sensing system and a phase compensation circuit thereof according to another embodiment of the disclosure.

As from another perspective, FIG. 9 illustrates a multi-scan touch sensing system and a phase compensation circuit thereof according to another embodiment of the disclosure. A phase compensation circuit 900 of the present embodiment is similarly to the phase compensation circuit 400 of FIG. 4, and a major difference between the two is that, for example, a signal processing unit 920 includes one single signal processing channel 922 in which a matrix operation unit 923 is also implemented by one single matrix circuit.

In comparison to the embodiment of FIG. 4, the signal processing channel 922 includes one single matrix operation unit 923. After the signal processing unit 920 has received the first component signals RX1-C and RXN-C and the second component signals RX1-S to RXN-S of each of the carrier signals, the matrix operation unit 923 of the signal processing unit 920 is configured to perform an inverse matrix operation on the first component signals RX1-C and RXN-C and the second component signals RX1-S to RXN-S. This inverse matrix operation processes the first component signals and the second component signals both demodulated by the demodulating operation in correspondence to the matrix operation of the touch panel 300, so as to obtain the data carried on each of the component signals, e.g. raw data.

In other words, the matrix operation unit of the present exemplary embodiment of the disclosure may be realized by using one or more circuitry blocks in terms of hardware implementation, such as FIG. 4 and FIG. 9, and is not particularly limited by the disclosure. That is, regarding the concept of the signal processing channels, the implementation of the exemplary embodiment of the disclosure includes but not limited to one or more circuitry blocks. The phase compensation method disclosed by the exemplary embodiments of the disclosure may be accomplished as long as the inverse matrix operation may be performed on the first component signals RX1-C to RXN-C and the second component signals RX1-S to RXN-S before said signals are mixed.

Figure 7:
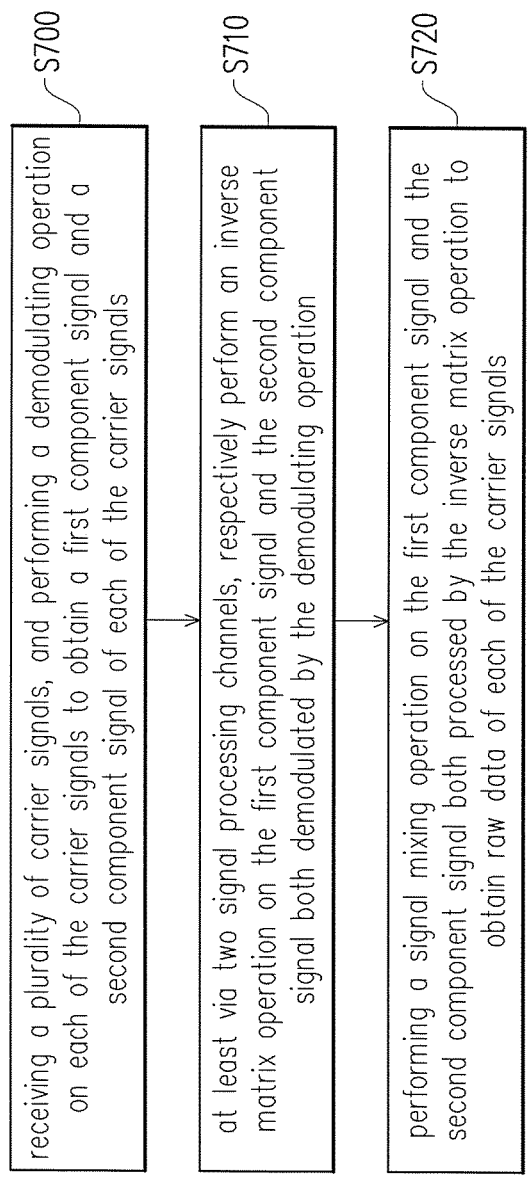
FIG. 7 is a flowchart illustrating steps of a phase compensation method for multi-scan in touch sensing system according to an embodiment of the disclosure.

FIG. 7 is a flowchart illustrating steps of a phase compensation method for multi-scan in touch sensing system according to an embodiment of the disclosure. Referring to FIG. 7, the phase compensation method of the present embodiment includes following steps. In step S700, a plurality of carrier signals are received, and a demodulating operation is preformed on each of the carrier signals to obtain a first component signal and a second component signal of each of the carrier signals. Subsequently, in step S710, an inverse matrix operation is respectively preformed, at least via two signal processing channels, on the first component signal and the second component signal both demodulated by the demodulating operation. Thereafter, in step S720, a signal mixing operation is preformed on the first component signal and the second component signal both processed by the inverse matrix operation to obtain the data carried on each of the carrier signals, e.g. raw data.

Figure 8:
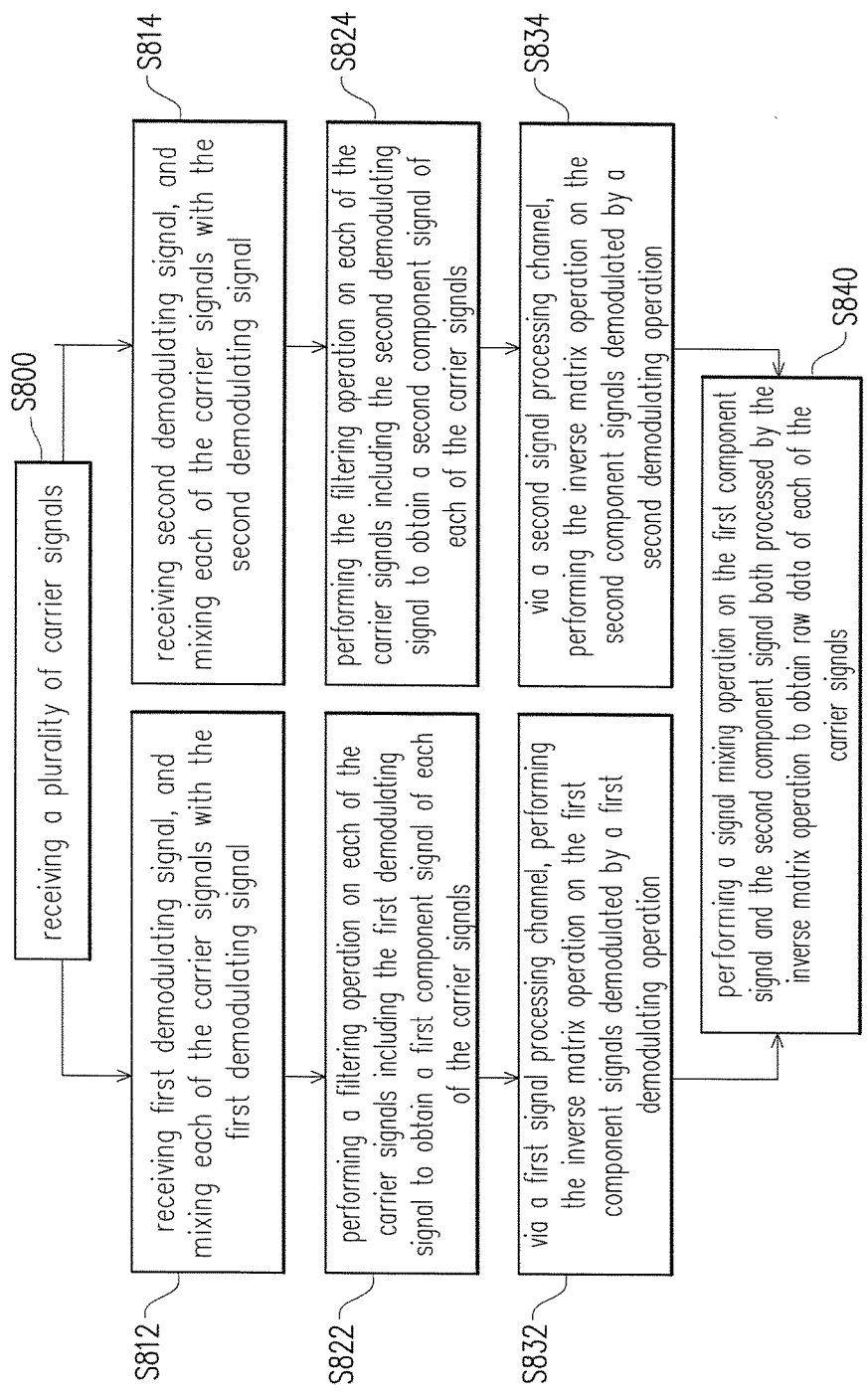
FIG. 8 is a flowchart illustrating steps of a phase compensation method for multi-scan in touch sensing system according to another embodiment of the disclosure.

FIG. 8 is a flowchart illustrating steps of a phase compensation method for multi-scan in touch sensing system according to another embodiment of the disclosure. Referring to FIG. 8, the phase compensation method of the present embodiment includes following steps. In step S800, a plurality of carrier signals are received. Subsequently, in step S812, a first demodulating signal is received, and each of the carrier signals is mixed with the first demodulating signal. Thereafter, in step S822, a filtering operation is performed on each of the carrier signals including the first demodulating signal, so as to obtain a first component signal of each of the carrier signals. Thereafter, in step S832, via a first signal processing channel, an inverse matrix operation is performed on the first component signals demodulated by a first demodulating operation. On the other hand, in step S814, a second demodulating signal is received, and each of the carrier signals is mixed with the second demodulating signal. Thereafter, in step S824, the filtering operation is performed on each of the carrier signals including the second demodulating signal, so as to obtain a second component signal of each of the carrier signals. Thereafter, in step S834, via a second signal processing channel, the inverse matrix operation is performed on the second component signals demodulated by a second demodulating operation. In step S840, a signal mixing operation is preformed on the first component signal and the second component signal both processed by the inverse matrix operation to obtain the data carried on each of the carrier signals, e.g. raw data.

In addition, sufficient teaching, suggestion, and implementation illustration regarding the phase compensation method of the embodiments of the disclosure may be obtained from the above embodiments depicted in FIG.2 to FIG. 6, thus related descriptions thereof are not repeated hereinafter.

In summary, according to the exemplary embodiments of the disclosure, the phase compensation method and the phase compensation for multi-scan in touch sensing system first perform the demodulating operation on the different component signals via the signal processing channels before performing the inverse matrix operation on the component signals demodulated by the demodulating operation. This method of phase compensation is capable of reducing hardware cost of the circuitry while effectively solving the phase spread of the signals in addition to automatically perform the compensation on the multi-scan touch sensing system.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A phase compensation method for multi-scan in touch sensing system, the method comprising:
receiving a plurality of carrier signals, and performing a demodulating operation on each of the carrier signals to obtain a first component signal and a second component signal of each of the carrier signals, wherein the received carrier signals are generated from a plurality of carrier signals having been transmitted to a touch panel and processed by a touch panel matrix;
respectively performing an inverse matrix operation by an inverse matrix determined at least according to the touch panel matrix on each of the first component signals and the second component signals each demodulated by the demodulating operation; and
performing a signal mixing operation on the first component signals and the second component signals each processed by the inverse matrix operation to obtain data carried on each of the carrier signals.

2. The phase compensation method of claim 1, wherein the step of respectively performing the inverse matrix operation on each of the first component signals and the second component signals each demodulated by the demodulating operation comprises:
via a signal processing channel, performing the inverse matrix operation on the first component signals demodulated by a first demodulating operation and the second component signals demodulated by a second demodulating operation.

3. The phase compensation method of claim 1, wherein the step of respectively performing the inverse matrix operation on each of the first component signals and the second component signals each demodulated by the demodulating operation comprises:
via a first signal processing channel, performing the inverse matrix operation on the first component signals demodulated by a first demodulating operation; and
via a second signal processing channel, performing the inverse matrix operation on the second component signals demodulated by a second demodulating operation.

4. The phase compensation method of claim 3, wherein the first component signals are one of an in-phase signal and a quadrature signal in a quadrature amplitude modulation mode, and the second component signals are another one of the in-phase signal and the quadrature signal in the quadrature amplitude modulation mode.

5. The phase compensation method of claim 4, wherein the first demodulating operation is one selected from an in-phase demodulating operation and a quadrature demodulating operation in correspondence to the first component signals, and the second demodulating operation is another one selected from the in-phase demodulating operation and the quadrature demodulating operation in correspondence to the second component signals.

6. The phase compensation method of claim 1, wherein the received carrier signals are already processed by a matrix operation before being received, and the inverse matrix operation processes the first component signals and the second component signals each demodulated by the demodulating operation in correspondence to the matrix operation.

7. The phase compensation method of claim 1, wherein the step of performing the signal mixing operation on the first component signals and the second component signals each processed by the inverse matrix operation comprises:
respectively performing a power operation on each of the first component signals with the inverse matrix operation processed and on each of the second component signals with the inverse matrix operation processed to perform the phase compensation on each of the first component signals and the second component signals; and
performing a summation operation on the first component signals and the second component signals each processed by the power operation.

8. The phase compensation method of claim 7, wherein the step of performing the signal mixing operation on the first component signals and the second component signals each processed by the inverse matrix operation further comprises:
performing a radical operation on the first component signals and the second component signals each processed by the power operation.

9. The phase compensation method of claim 1, wherein the step of respectively performing the inverse matrix operation on each of the first component signals and the second component signals each demodulated by the demodulating operation is performed before the step of performing the signal mixing operation on the first component signals and the second component signals each processed by the inverse matrix operation to obtain the data carried on each of the carrier signals.

10. The phase compensation method of claim 1, wherein the step of performing the demodulating operation on each of the carrier signals to obtain the first component signal and the second component signal of each of the carrier signals comprises:
respectively receiving a first demodulating signal and a second demodulating signal, and mixing each of the carrier signals with the first demodulating signal and the second demodulating signal; and
performing a filtering operation on each of the carrier signals including the first demodulating signal and on each of the carrier signals including the second demodulating signal to obtain the first component signal and the second component signal of each of the carrier signals.

11. The phase compensation method of claim 1, wherein the power operation is a square operation.

12. A phase compensation circuit for multi-scan in touch sensing system, comprising:
a plurality of demodulators, receiving a plurality of carrier signals, and performing a demodulating operation on each of the carrier signals to obtain a first component signal and a second component signal of each of the carrier signals, wherein the received carrier signals are generated from a plurality of carrier signals having been transmitted to a touch panel and processed by a touch panel matrix; and
a processor, configured to:
respectively perform an inverse matrix operation by an inverse matrix determined at least according to the touch panel matrix on each of the first component signals and the second component signals each demodulated by the demodulating operation; and perform a signal mixing operation on the first component signals and the second component signals each processed by the inverse matrix operation to obtain data carried on each of the carrier signals.

13. The phase compensation circuit of claim 12, wherein each of the demodulators comprises:
   an amplifier, configured to receive and amplify the corresponding one of the carrier signals to transfer the corresponding one of the carrier signals to the first demodulating channel and the second demodulating channel of the demodulator.

14. The phase compensation circuit of claim 12, further comprising:
   a signal generator, configured to generate the first demodulating signal and the second demodulating signal.

15. The phase compensation circuit of claim 12, wherein the processor comprises:
   a signal processing channel, configured to perform the inverse matrix operation on each of the first component signals and the second component signals.

16. The phase compensation circuit of claim 12, wherein the processor comprises:
   a first signal processing channel, configured to perform the inverse matrix operation on the first component signals; and
   a second signal processing channel, configured to perform the inverse matrix operation on the second component signals.

17. The phase compensation circuit of claim 16, wherein the first component signals are one of an in-phase signal and a quadrature signal in a quadrature amplitude modulation mode, and the second component signals are another one of the in-phase signal and the quadrature signal in the quadrature amplitude modulation mode.

18. The phase compensation circuit of claim 17, wherein the first signal processing unit is one selected from an in-phase demodulating channel and a quadrature demodulating channel in correspondence to the first component signals, and configured to perform the demodulating operation on the first component signal, and the second signal processing unit is one selected from the in-phase demodulating channel and the quadrature demodulating channel in correspondence to the second component signals, and configured to perform the demodulating operation on the second component signal.

19. The phase compensation circuit of claim 12, wherein the received carrier signals are already processed by a matrix operation before being received, and the inverse matrix operation processes the first component signals and the second component signals each demodulated by the demodulating operation in correspondence to the matrix operation.

20. The phase compensation circuit of claim 12, wherein the processor further configured to:
   respectively perform a power operation on each of the first component signals with the inverse matrix operation processed and on each of the second component signals with the inverse matrix operation processed to perform the phase compensation on each of the first component signals and the second component signals; and
   perform a summation operation on the first component signals and the second component signals each processed by the power operation.

21. The phase compensation circuit of claim 20, wherein the processor is further configured to:
   perform a radical operation on the first component signals and the second component signals each processed by the power operation.

22. The phase compensation circuit of claim 12, wherein each of the demodulators comprises:
   a first demodulating channel, configured to mix a corresponding one of the carrier signals with a first demodulating signal, and perform a filtering operation on the corresponding one of the carrier signals mixed with and including the first demodulating signal to obtain the first component signal of the corresponding one of the carrier signals; and
   a second demodulating channel, configured to mix the corresponding one of the carrier signals with a second demodulating signal, and perform the filtering operation on the corresponding one of the carrier signals mixed with and including the second demodulating signal to obtain the second component signal of the corresponding one of the carrier signals.

23. The phase compensation circuit of claim 12, wherein the power operation is a square operation.

\* \* \* \* \*